Nov. 12, 1968   S. S. SAUNDERS, JR   3,410,225
MECHANISM FOR ORIENTING PALLETS
Filed Oct. 4, 1965                                2 Sheets-Sheet 1
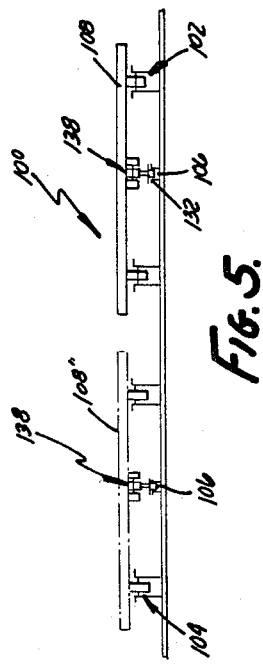
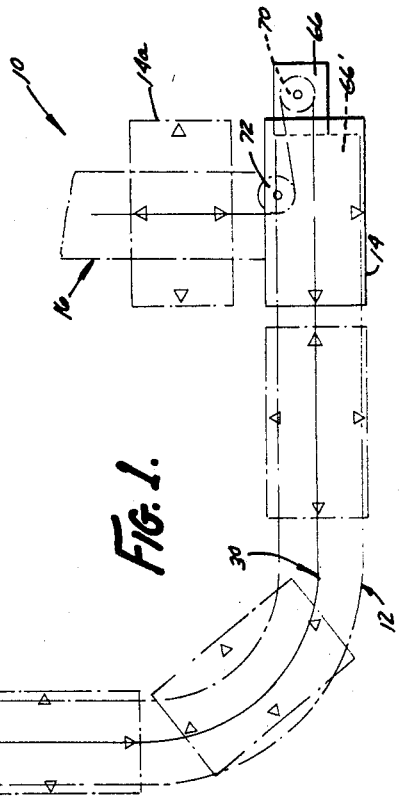
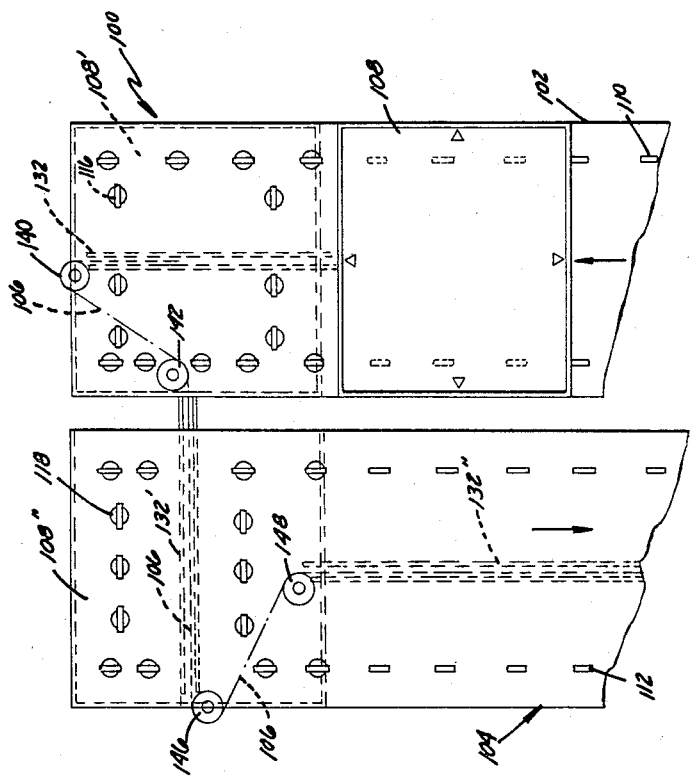
INVENTOR.
STANLEY STEWART SAUNDERS JR.
BY
ATTORNEYS

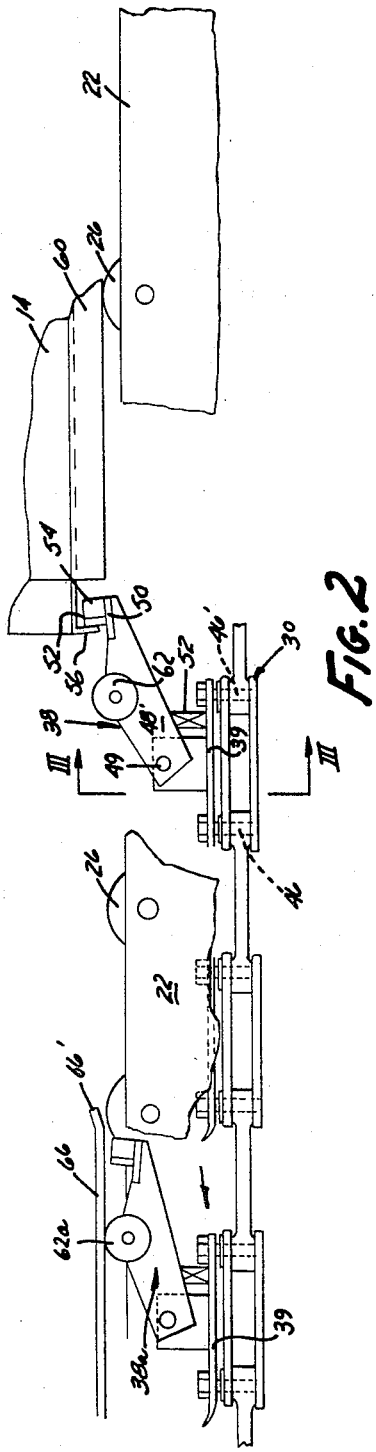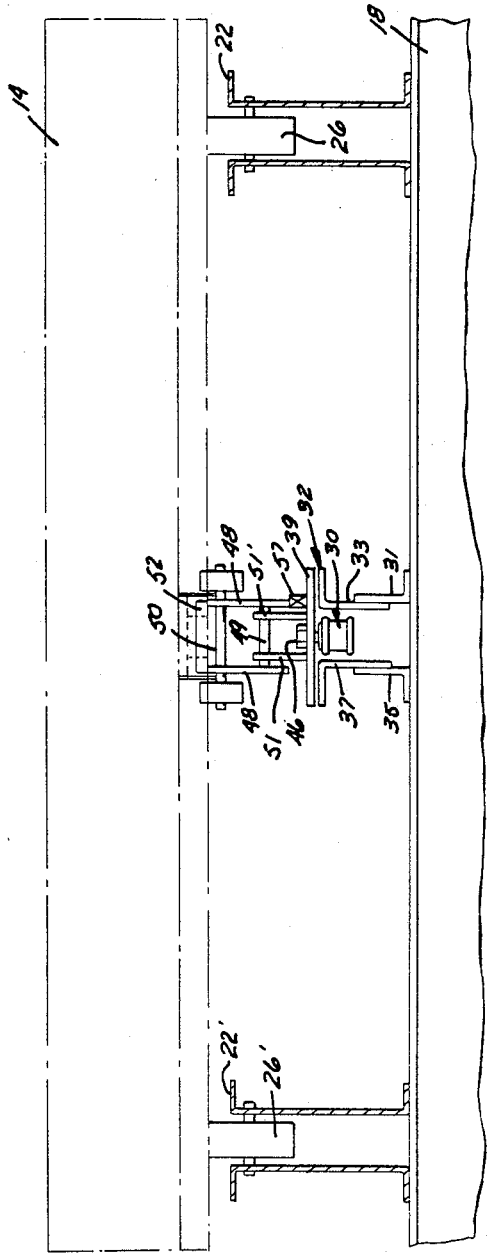

United States Patent Office 3,410,225
Patented Nov. 12, 1968

3,410,225
MECHANISM FOR ORIENTING PALLETS
Stanley Stewart Saunders, Jr., Grand Rapids, Mich., assignor to Rapistan Incorporated, a corporation of Michigan
Filed Oct. 4, 1965, Ser. No. 492,503
8 Claims. (Cl. 104—172)

ABSTRACT OF THE DISCLOSURE

A conveyor apparatus for maintaining article orientation with conveyor change of direction including conveyor surfaces at angles to each other at a juncture, and a common article propelling drive extending along the first conveyor surface, through the juncture, and then along the second conveyor surface, with control means at the juncture cooperative with article engaging portions of said drive to cause disengagement of said portions from articles on said first surface upon said articles reaching the juncture, and re-engagement of said portions where re-oriented with the consistently oriented articles, along said second surface—the drive portions being cam followers biased into engaging position and the control means being camming means operable on said followers to cause controlled article disengagement and re-engagement.

---

This invention relates to conveyor equipment, and more particularly to powered conveyor apparatus capable of uniquely changing the direction of movement of articles on the conveyor to a conveyor at an angle thereto, and of advancing the articles both on the original conveyor means and on the adjacent conveyor means with the same propelling means.

This invention has special significance for conveyor apparatus that employs pallets, and consequently will be explained particularly in relation to this type of equipment. However, it will be readily understood, upon studying the descriptive and disclosure material herein, that the concept presented is useful in a variety of different types of conveyor equipment, and in a variety of different environments.

Handling of objects in a warehousing facility, and in manufacturing plants, and in a variety of other environments is frequently accomplished with the use of supporting pallets which are advanced along a conveyor complex. In a typical adaptation such as in a warehouse facility, the individual conveyor runs or lines are separated by access aisles, and are frequently interconnected by curved conveyor tracks requiring substantial space to effect smooth article transition. The over-all arrangement assures a great deal of space for each run and each curve.

The driving or propelling means for a plurality of different runs, curves and transfer units includes a complex variety of separate chains or belts, motors and other cooperative components.

On such a system, the pallets also constantly change directions and orientations in an involved complex manner.

Since space is costly, any increase in efficiency of its use is greatly beneficial. Since motors, belts, chains, etc. are costly to engineer, install and operate, any decrease in the number of such units is greatly beneficial. Also, as pallets or other articles are advanced along such a system, space requirements, particular assembly requirements, or other related factors, may cause it to be desirable to retain the particular orientation of an article while changing its direction of movement.

It is an object of this invention to provide a unique conveyor and propelling means arrangement enabling maximum usage of a space or area, with minimum space employment for access aisles and no space being required for conveying curves. An area can be almost solidly filled with useful conveyor lines.

Another object of this invention is to provide a unique conveyor system and propelling means therefor enabling one powered propelling means to handle articles on two or more conveyor runs at selected angles to each other, even angles of 90° or more, without auxiliary power equipment or release equipment, as is usually necessary. The propelling means can be greatly simplified over conventional assemblies presently required, and cost can be substantially reduced. With the invention, one endless chain loop or equivalent propelling means can accomplish rotation of a double line of pallets, and in fact can controllably advance a multiple of adjacent lines. The lines can be placed immediately adjacent each other for optimum space usage.

It is another object of this invention to provide conveyor apparatus capable of changing the direction of movement of articles thereon, while retaining the original orientation of the articles.

Another object of this invention is to provide conveyor apparatus capable of advancing articles from one conveyor portion to a second conveyor portion at an angle thereto, while not changing the orientation of the article through the same angle as that of the change of direction.

Another object of this invention is to provide conveyor apparatus that conducts an article along one conveyor portion, releases it at the juncture of that conveyor portion with a second conveyor portion transverse to it, and then cause the second conveyor to advance the article along the second conveyor portion, even while retaining the original article orientation.

A further object of this invention is to provide a conveyor apparatus that achieves all of the above objects with a relatively simple mechanical apparatus operating automatically and dependably, using simple spring biasing and mechanical camming equipment.

These and several other objects of this invention will become apparent upon studying the following specification in conjunction with the drawings in which:

FIG. 1 is a plan schematic view of one typical embodiment of the novel apparatus;

FIG. 2 is a side elevational, fragmentary, enlarged view of the apparatus in FIG. 1;

FIG. 3 is a sectional, further enlarged view taken on plane III—III through the apparatus in FIG. 2;

FIG. 4 is a fragmentary, plan view of a second arrangement of the novel apparatus; and FIG. 5 is a reduced sectional view of the apparatus in FIG. 4.

Referring now specifically to the drawings, the complete conveyor system 10 illustrated in FIG. 1 includes a first conveyor portion or line 12 adapted to move articles 14 therealong in a first direction (to the right as viewed in FIG. 1), and a second conveyor portion or line 16 adapted to move articles in a second direction at a selected angle to the first direction (up the page as viewed in FIG. 1).

These two conveyor portions are generally transverse to each other, joining each other at a juncture which is illustrated to be as a right angle intersection. Conveyor portion 12 is shown to include a segment 13 adjacent curved part to illustrate that the conveyor can be a multiple direction system. The direction of the part of portion 12 joining portion 16 is of particular interest because of what occurs at the intersection.

The specific conveyor construction can vary greatly. It is shown, for example, in FIGS. 2 and 3 to include basic support structure such as elongated beams 18 upon which transverse girders 20 are mounted to support the side rails 22 and 22'. These side rails are shown as channel-type elements formed of two back-to-back, C-shaped rail elements. Mounted between each of these two rail elements of the side rails is a plurality of rotatable wheels 26 and 26' which collectively effectuate an article support surface. These rotatable article supporting elements support articles 14 such as pallets thereon while allowing the articles to move along the conveyor.

Centrally of the conveyor surface is an endless, flexible article advancing drive means, i.e., propelling means, illustrated in this specific embodiment to be an endless link chain 30. This chain can have a variety of link configurations, or can be of equivalent endless drive constructions. This chain is guided in its movement by a guide track assembly 32. The guide track assembly may be in the form of a channel formed by connected angle sections 31 and 33, and 35 and 37. The upper angle sections have oppositely oriented flanges forming an upper, flat, coplanar pair of slide tracks astraddle the channel slot receiving the chain. A plurality of slide plates 39 forming part of article engaging units 38 slide along these slide tracks.

The article engaging means 38 controllably advance articles such as pallets along the conveyor. Each of these engaging means mounted to the endless propelling drive element, has an article engaging element shiftable between an elevated article engaging active condition (as shown in FIG. 2 by the righthand element) and a depressed inactive condition out of engagement with the articles (as shown by the lefthand element in FIG. 2).

The article advancing units 38 are attached to the endless element chain links by a pair of vertical studs 46 and 46' secured to each slide plate 39. A pair of upstanding brackets 51 and 51' are secured to each slide plate, and mount a horizontal pivot bar 49. A pair of parallel plates 48 and 48' are pivotally mounted at their front ends on these bars. The rear ends of these plates are secured together by a cross piece 50. An upstanding article engaging flange 52, braced by back flanges 54, is secured to plate 50. This engages a pallet 14 by catching behind a fixed, downwardly depending cooperative flange 56 on the front of the pallet, transverse to conveyor portion 12, to effect a hooked connection, when the unit is elevated to a position with flange 52 above the conveyor wheels. The shiftable element is biased to an elevated upper position by a compression spring 57 between it and slide plate 39. A pair of camming rollers 62 and 62' are mounted on the outside faces of plates 48 and 48' on rotational axles to shift the element downwardly as described hereinafter.

Each of the pallets also includes another like engagement flange 60 along its lateral side, transverse to the first flange 56. It is positioned adjacent to and oriented transverse to the branch conveyor portion 16 down which it will travel after release from conveyor portion 12.

The pair of spaced cam follower rollers 62 and 62' attached to plates 48 and 48' project above the plates as illustrated in FIG. 2. These cam follower rollers cooperate with a depressing camming means, shown here simply as a flat horizontal plate 66 selectively positioned to depress the roller elements (as shown by roller elements 62a on the article engagement device 38a in FIG. 2), away from a pallet to release the pallet, and hold them depressed for a controlled distance. The front edge 66' of camming plate 66 may include a diagonal surface to assure smooth release of the pallet. The shape of this camming plate 66 is configurated as shown in FIG. 1 to hold the rollers and thus the engagement dog 52 in a depressed, non-engaging position while the chain or other endless propelling element changes direction after its movement along the first conveyor portion. The endless element travels past the juncture, then around a first sprocket 70, which returns it back to the juncture, then around a second sprocket 72 at the juncture which re-orients it in the direction of the second conveyor portion 16. Camming plate 66 maintains the dog in a depressed, non-engaging, non-driving condition until the dog approaches the second sprocket 72. At this position, it is released from the camming surface so that the biasing means can shift the engaging device back to its original elevated position. It is then in a condition to engage lateral flange 60 on article 14 and move the article from the position shown in solid in FIG. 1 to the position at 14a, down conveyor portion 16. The article has thus changed directions and is being propelled down a new conveyor line generally normal to the original line, yet with the same propelling chain element. The same article orientation is also maintained even though the direction has changed. The endless drive means 30 can be operated by any suitable power means, such as a motor operably engaged with sprocket 72.

Not only can the novel assembly enable article transition at a direct angle of 90°, more or less, but it can also employ conveyor lines that are actually parallel to each other and immediately adjacent each other. Referring for example to FIGS. 4 and 5, conveyor assembly 100 there schematically illustrated includes a first conveyor line or run 102 immediately adjacent a second conveyor line or run 104. These closely adjacent parallel conveyor lines have terminal ends adjacent each other, and have a common article propelling means 106 for both. The conveyors can advance articles such as pallet 108 in the opposite directions (as indicated by the arrows) to enable one chain loop or other equivalent propelling means to accomplish a complete rotation of a double line of pallets. The immediate adjacency of the two lines is possible because the changes in direction of the pallets or other articles are at right angles, to transfer the pallet from one conveyor line to the adjacent conveyor line in a manner to be described.

Each conveyor line can include a suitable conveyor surface means formed of any desirable components including non-friction elements such as the plurality of rollers 110 on conveyor line 102 and 112 on line 104. At the terminal end portion of the conveyor lines are a plurality of ball-type transfers or rotatable swivel casters 116 and 118 to allow pallet movement in selected directions. These may be substituted by a slide surface or other equivalent.

The endless single loop propelling means 106 is preferably a chain and includes disconnect dog units 138 like those illustrated at 38 in FIGS. 2 and 3. These are only shown schematically in FIG. 4 and FIG. 5. Control plates such as that illustrated at 66 in FIG. 2 are provided at selected spots to control the release and re-engagement of the propelling means with the pallets. These cooperate with the dogs in the same manner as in the first form of the invention.

As propelling means 106, guided in channel 132, approaches the terminal portion of conveyor line 102, the dog is depressed and released from the pallet by an adjacent control plate, so that the pallet, when in the position illustrated in phantom at 108', stops on the end of conveyor line 102. The endless propelling means then moves around a sprocket 140 with the dog depressed, across to sprocket 142 to be re-oriented in a new direction normal or transverse to the original direction. At this position, the dog is released from the plate to be biased upwardly, thereby engaging the edge of the pallet at 108' to transfer it across to the adjacent terminal end of conveyor line 104, i.e. to the position illustrated by pallet 108" in phantom lines. As chain 106 moves in channel 132' and the pallet reaches this new position, it is stopped by release of the dog by a second plate as the dog reaches sprocket 146. The endless drive element 106 then changes direction by passing around sprocket 148. It is routed back to the center of conveyor line 104 where it again is re-oriented on sprocket 148 to be aligned along the direction of travel of conveyor line 104. The appropriate dog is then released again, thereby elevating its engagement portion with the front edge of the pallet in the position of 108" to advance the pallet along conveyor line 104 as endless conveying means 106 moves in channel 132".

It will be understood that the particular support means forming the conveyor surface can be widely varied, with those shown being merely illustrative. It will also be realized that, not only can two of these adjacent lines be accommodated by the same endless drive means, but in fact, an entire series of adjacent lines can be accommodated, to thereby make optimum usage of a large space provided for warehousing, assembly operations, or a variety of other purposes. Yet, the complete structure is relatively simple, with a minimum of components being required. It desired, the parallel lines can be spaced further, with a separate transfer surface being provided between the adjacent terminal ends. In fact, a conveyor section normal to both lines can be employed, with each transfer being like that at the junction shown in FIG. 1.

It is conceivable that, within the concept presented, it may be desired to change the article orientation a small angle which is not the same as the angle of change. Obviously, the rectangular form of the article may be any particular substitute configuration as is encountered with a particular usage, environment, type of article, and conveyor system. Several other obvious variations might be made in the apparatus described and shown in one illustrative form. The driving means may be other than the endless chain shown. The mechanical camming and spring biasing structure is preferred due to its simplicity and dependability, while still achieving automatic change of direction without change of orientation. However, this could also be varied.

I claim:

1. A pallet orienting conveyor apparatus comprising: conveyor track means for conveying articles thereon, and having a first portion oriented in one direction and a second portion oriented to form an intersection with said first portion; an intermediate zone adjacent said intersection; endless article advancing drive means extending along said first portion, through said intermediate zone adjacent said intersection, and then along said second portion; said drive means including article propelling means along its length, having an active, article-advancing condition and an inactive condition; and control means at said intermediate zone, cooperative with said article propelling means in a manner to place said propelling means in inactive condition upon reaching said intersection, to release a propelled article, and to place said propelling means back into active condition after passage through said intermediate zone to again propel the article along said second portion while generally retaining the article orientation.

2. A conveyor apparatus comprising: article supporting conveyor track means having a first portion oriented in one direction and a second portion at an angle juncture to said first portion, to support an article conveyed along said first portion and then along said second portion; an article advancing drive means extending along said first portion operable to advance articles toward said second portion and juncture, and also extending through said juncture and along said second portion to be continuous therethrough, and operable to advance articles away from said first portion and juncture; article advancing control means at said juncture operably associated with said article advancing drive means to temporarily remove said drive means out of driving relation with an article reaching said juncture on said first portion, and to place said drive means along said second portion back into driving relation with the article at said juncture, to thereby advance the article along said second portion while retaining the orientation it had on said first portion.

3. Conveyor apparatus comprising: article supporting conveyor track means having a first portion oriented in one direction and a second portion oriented in another direction and joining said first portion at a juncture; endless drive means extending along and movable along said first portion and then along said second portion; a plurality of article engaging means along said drive means and movable therewith; direction changing means at said juncture, operably associated with said drive means to change its direction of movement from along said first portion to along said second portion; and control means at said juncture controlling shifting of said article engaging means to inactive condition upon their reaching the area of said juncture, and controlling shifting of said article engaging means back to active condition upon leaving said juncture to move along said second portion without making a corresponding change in article orientation.

4. The apparatus in claim 3 wherein said endless drive means includes biasing means associated with each article engaging means to bias it into one condition, and said control means comprises camming means operably engageable with each article engaging means to shift it against its bias into the second condition.

5. The apparatus in claim 3 wherein each of said article engaging means is shiftable on said drive means, and includes biasing means between it and said drive means biasing it into article engaging position; and wherein said control means comprises camming means engageable with said article engaging means to temporarily shift it against the force of said biasing means out of article engaging position while said drive means changes directions between said first and second portions.

6. Conveyor apparatus comprising: conveyor surface means having portions oriented in different directions at an angle to each other, with junctures between said portion; article advancing means movable consecutively along said portions to advance articles on said surface means consecutively in different directions; said advancing means including an endless flexible drive means and a plurality of spaced article engaging means attached thereto and movable therewith; said engaging means being shiftable from an active article engaging position to an inactive position; said advancing means moving through and past the juncture in one direction, through a guided loop, and then moving back through said juncture in the other direction; control camming means for said advancing means, adapted to deactivate said advancing means at the juncture when said advancing means is moving in the first direction and re-activate said advancing means at the same juncture when said advancing means is moving in the second direction; cam follower means on each of said engaging means; and said control camming means cooperative with said cam follower means to enable shifting of each of said engaging means from active to inactive position and then back to active position.

7. Conveyor apparatus for changing the direction of article movement through an intermediate angle without rotating the article through said angle, comprising: means forming a conveyor surface having first and second portions; at least one article thereon having engageable means for driving it; said first portion being in a first direction for moving articles in said first direction; said second portion being in a second direction at an angle to said first direction, for moving articles in said second direction; said first and second portions having a junction with each other to allow article flow first along said first portion and then along said second portion; said engageable means including first means transverse to said first conveyor portion and second means transverse to said second conveyor portion; powered article advancing means movable along said first portion and along said second portion in said first and second directions respectively, including means to change the direction thereof; said advancing means positioned to move through said juncture while moving in said first direction and in said second direction; said advancing means including article engaging means movable therewith and cooperable with either of said engageable means; and de-activating means at said junction, operable on said article engaging means to de-activate it from said first means at said junction when moving in said first direction, and re-activate it to said second means at said junction when moving in said second direction, to cease advancing an article in said one direction, and then start advancing the article in said second direction.

8. A conveyor apparatus comprising:
at least two parallel conveyor lines adjacent each other and including an article transfer zone therebetween; continuous endless article propelling means common to both said lines and to said transfer zone and including releasable article engaging means; said re-orienting means operably associated with said propelling means to change the direction of travel thereof causing said propelling means to travel along said first line, then change direction and travel through said transfer zone, and then change direction and travel along said second line; and engagement control means adjacent said transfer zone and including means to disengage said article engaging means from articles on said first line upon reaching said transfer zone, to re-engage said article engaging means to transfer articles through said transfer zone to said second line, to again disengage said article engaging means from transferred articles, and then to re-engage said article engaging means to transferred articles to move them along said second line to control article orientation with change of article movement from said first line to said second line.

References Cited

UNITED STATES PATENTS

| | | | |
|---|---|---|---|
| 2,353,638 | 7/1944 | Beaulieu et al. | 198—19 |
| 2,521,727 | 9/1950 | Kappen | 104—50 X |
| 2,640,580 | 6/1953 | De Burgh | 104—172 X |
| 2,970,413 | 2/1961 | Miklosek | 104—48 X |
| 2,994,282 | 8/1961 | Patterson | 104—172 X |
| 2,997,002 | 8/1961 | Melmer | 104—172 X |
| 3,125,204 | 3/1964 | Loven | 198—19 |
| 3,340,820 | 9/1967 | Poisson | 104—48 |

DRAYTON E. HOFFMAN, *Primary Examiner.*